US011731619B2

(12) United States Patent
Moriya et al.

(10) Patent No.: US 11,731,619 B2
(45) Date of Patent: Aug. 22, 2023

(54) COLLISION AVOIDANCE ASSIST APPARATUS

(71) Applicants: TOYOTA JIDOSHA KABUSHIKI KAISHA, Toyota (JP); CONTINENTAL AUTOMOTIVE CORPORATION, Yokohama (JP)

(72) Inventors: Takashi Moriya, Toyota (JP); Sho Hashimoto, Shizuoka-ken (JP); Yusuke Fukui, Toyota (JP); Akshay Rajendra, Frankfurt (DE); Michael Patzelt, Frankfurt (DE)

(73) Assignees: TOYOTA JIDOSHA KABUSHIKI KAISHA, Toyota (JP); CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 252 days.

(21) Appl. No.: 17/366,672

(22) Filed: Jul. 2, 2021

(65) Prior Publication Data
US 2022/0017080 A1 Jan. 20, 2022

(30) Foreign Application Priority Data
Jul. 16, 2020 (JP) ................................. 2020-121851

(51) Int. Cl.
*B60W 30/09* (2012.01)
*B60W 30/095* (2012.01)
(Continued)

(52) U.S. Cl.
CPC ............ *B60W 30/09* (2013.01); *B60W 10/20* (2013.01); *B60W 30/0956* (2013.01); *B60W 10/18* (2013.01); *B60W 2552/53* (2020.02)

(58) Field of Classification Search
CPC .. B60W 30/09; B60W 10/20; B60W 30/0956; B60W 10/18; B60W 2552/53; B60W 2710/202; B60W 2554/4029
See application file for complete search history.

(56) References Cited

U.S. PATENT DOCUMENTS

2011/0022317 A1* 1/2011 Okita ..................... B60W 30/12
  701/301
2016/0327947 A1* 11/2016 Ishikawa .............. G05D 1/0061
(Continued)

FOREIGN PATENT DOCUMENTS

JP       5391926 B2 *  1/2014
JP    2017-43262 A    3/2017
(Continued)

*Primary Examiner* — Donald J Wallace
*Assistant Examiner* — Daniel M. Robert
(74) *Attorney, Agent, or Firm* — Sughrue Mion, PLLC

(57) ABSTRACT

A collision avoidance assist apparatus calculates a lane marking recognition reliability level and execute an emergency steering control. The emergency steering control includes processes to determine a target steering torque to avoid a collision of a vehicle with an obstacle when determining that the vehicle has a high probability of colliding with the obstacle, a moving lane defined by the left and right lane markings is a straight lane, and the calculated lane marking recognition reliability level is equal to or higher than a first threshold reliability level, and apply a steering torque corresponding to the target steering torque to a steering mechanism. The collision avoidance assist apparatus stops executing the emergency steering control when the lane marking recognition reliability level becomes lower than a second threshold reliability level set to a value lower than the first threshold reliability level.

2 Claims, 6 Drawing Sheets

(51) Int. Cl.
    *B60W 10/20*      (2006.01)
    *B60W 10/18*      (2012.01)

(56) References Cited

U.S. PATENT DOCUMENTS

| | | | |
|---|---|---|---|
| 2017/0057498 A1 | 3/2017 | Katoh | |
| 2017/0166254 A1 | 6/2017 | Katoh | |
| 2017/0291603 A1* | 10/2017 | Nakamura | B60W 30/095 |
| 2018/0037230 A1* | 2/2018 | Otake | B60W 10/06 |
| 2018/0178783 A1 | 6/2018 | Saiki | |
| 2018/0350242 A1* | 12/2018 | Fujii | B60W 30/18163 |
| 2020/0114917 A1* | 4/2020 | Oguro | B60W 30/181 |
| 2020/0272835 A1* | 8/2020 | Cheng | B60W 50/14 |
| 2021/0009117 A1* | 1/2021 | Emura | G08G 1/16 |
| 2021/0331703 A1* | 10/2021 | Duan | B60W 60/0027 |
| 2021/0350149 A1* | 11/2021 | Lu | H04N 1/6016 |
| 2021/0357663 A1* | 11/2021 | Okada | B60W 60/001 |
| 2022/0017079 A1* | 1/2022 | Kakeshita | B60W 10/20 |

FOREIGN PATENT DOCUMENTS

| | | |
|---|---|---|
| JP | 2017-105383 A | 6/2017 |
| JP | 2018-106230 A | 7/2018 |

\* cited by examiner

COLLISION AVOIDANCE ASSIST APPARATUS

BACKGROUND

Field

The invention relates to a collision avoidance assist apparatus which steers a vehicle to avoid a collision of the vehicle with an obstacle when the vehicle probably collides with the obstacle.

Description of the Related Art

The collision avoidance assist apparatus disclosed in JP 2017-43262 A is configured to detect an obstacle ahead of a vehicle and steer steered wheels of the vehicle to avoid a collision of the vehicle with the obstacle when the vehicle probably collides with the obstacle.

The inventors of this application are considering a collision avoidance assist apparatus which steers the vehicle to avoid the collision of the vehicle with an obstacle so as not to move the vehicle out of a lane defined by a left white line and a right white line provided on a road on which the vehicle moves.

Hereinafter, the lane defined by the left and right white lines provided on the road on which the vehicle moves, will be referred to as "moving lane". Further, a control of steering the vehicle to avoid the collision of the vehicle with the obstacle so as not to move the vehicle out of the moving lane as described above, will be referred to as "emergency steering control".

The collision avoidance assist apparatus recognizes the moving lane, based on the left and right white lines provided on the road. In this connection, if the white lines are mistakenly recognized, the adequate emergency steering control cannot be executed. Thus, the collision avoidance assist apparatus executes the emergency steering control as long as a reliability level of overall recognition results on the left and right white lines is relatively high.

Also, for the same reasons, the collision avoidance assist apparatus stops or cancels executing the emergency steering control when the reliability level of the overall recognition results on the left and right white lines is relatively low while the emergency steering control is being executed.

While the emergency steering control is being executed, the collision avoidance assist apparatus may not recognize a part of the white line due to lateral motion of the vehicle and blinding the part of the white line by the obstacle. Thereby, it has been found that the reliability level of the recognition results on the white line at the left or right side of the obstacle opposite to the side of the obstacle which the vehicle passes by, is low. Thus, the overall reliability level of the recognition results on the left and right white lines by the collision avoidance assist apparatus may be low while the emergency steering control is being executed. Thus, the collision avoidance assist apparatus may unnecessarily stop executing the emergency steering control.

SUMMARY

The invention has been made for solving the problems described above. An object of the invention is to provide a collision avoidance assist apparatus which can eliminate an unnecessary execution of a process of stopping executing the emergency steering control.

A collision avoidance assist apparatus (10) according to the invention comprises (i) a lane marking recognition device (21b) which recognizes a left lane marking (WL) and a right lane marking (WR) provided on a road on which a vehicle (SV) moves, (ii) an obstacle recognition device (21) which recognizes an obstacle in an area ahead of the vehicle (SV), (iii) an electric motor (52) which applies a steering torque to a steering mechanism including a steering wheel (SW) of the vehicle (SV) to change a steering angle of at least one steered wheel of the vehicle (SV), and (iv) an electronic control unit (20).

The electronic control unit (20) is configured to calculate a lane marking recognition reliability level representing a reliability level of an overall recognition result on the left and right lane markings (WL and WR) (see a step 510 in FIG. 5). Further, the electronic control unit (20) is configured to execute an emergency steering control (see a step 520 in FIG. 5). The emergency steering control includes a process to determine a target steering torque which changes the steering angle to avoid a collision of the vehicle (SV) with the obstacle so as not to move the vehicle (SV) out of the moving lane when (i) the electronic control unit (20) determines that the vehicle (SV) has a high probability of colliding with the obstacle, (ii) a moving lane defined by the left and right lane markings (WL and WR) is a straight lane, and (iii) the calculated lane marking recognition reliability level is equal to or higher than a first threshold reliability level (see cases of determining "Yes" at steps 505 and 515 in FIG. 5). In addition, the emergency steering control includes a process to drive the electric motor (52) to apply the steering torque corresponding to the determined target steering torque to the steering mechanism.

The electronic control unit (20) is configured to stop executing the emergency steering control (see a step 620 in FIG. 6) when the lane marking recognition reliability level becomes lower than a second threshold reliability level set to a value lower than the first threshold reliability level (see a case of determining "No" at a step 615 in FIG. 6).

Thereby, the lane marking recognition reliability level does not readily become lower than the second threshold reliability level even when the lane marking recognition reliability level is lowered due to (i) the lateral motion of the vehicle derived from an execution of the emergency steering control and (ii) blinding the white line by the obstacle. Thus, the unnecessary execution of the process of stopping executing the emergency steering control can be eliminated.

According to an aspect of the invention, the electronic control unit (20) may be configured to calculate the lane marking recognition reliability level, based on both of the left and right lane markings (WL and WR) before the electronic control unit (20) starts executing the emergency steering control. In this case, the electronic control unit (20) may be configured to calculate the lane marking recognition reliability level, based on only one of the left and right lane markings (WL and WR) at the side of the obstacle which the vehicle (SV) passes by while the electronic control unit (20) executes the emergency steering control.

According to this aspect of the invention, the lane marking recognition reliability level is calculated, based only on the lane marking having the reliability level of the recognition results which has not been lowered due to behaviors of the vehicle derived from the execution of the emergency steering control. Thus, the lane marking recognition reliability level can be maintained at a high level while the emergency steering control is being executed. Thus, it can be ensured that the lane marking recognition reliability level is maintained at a higher level than the second threshold reliability level while the emergency steering control is being executed. Thus, the unnecessary execution of the process of stopping executing the emergency steering control can be surely eliminated.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE EMBODIMENTS

<Configuration>

Figure 1:
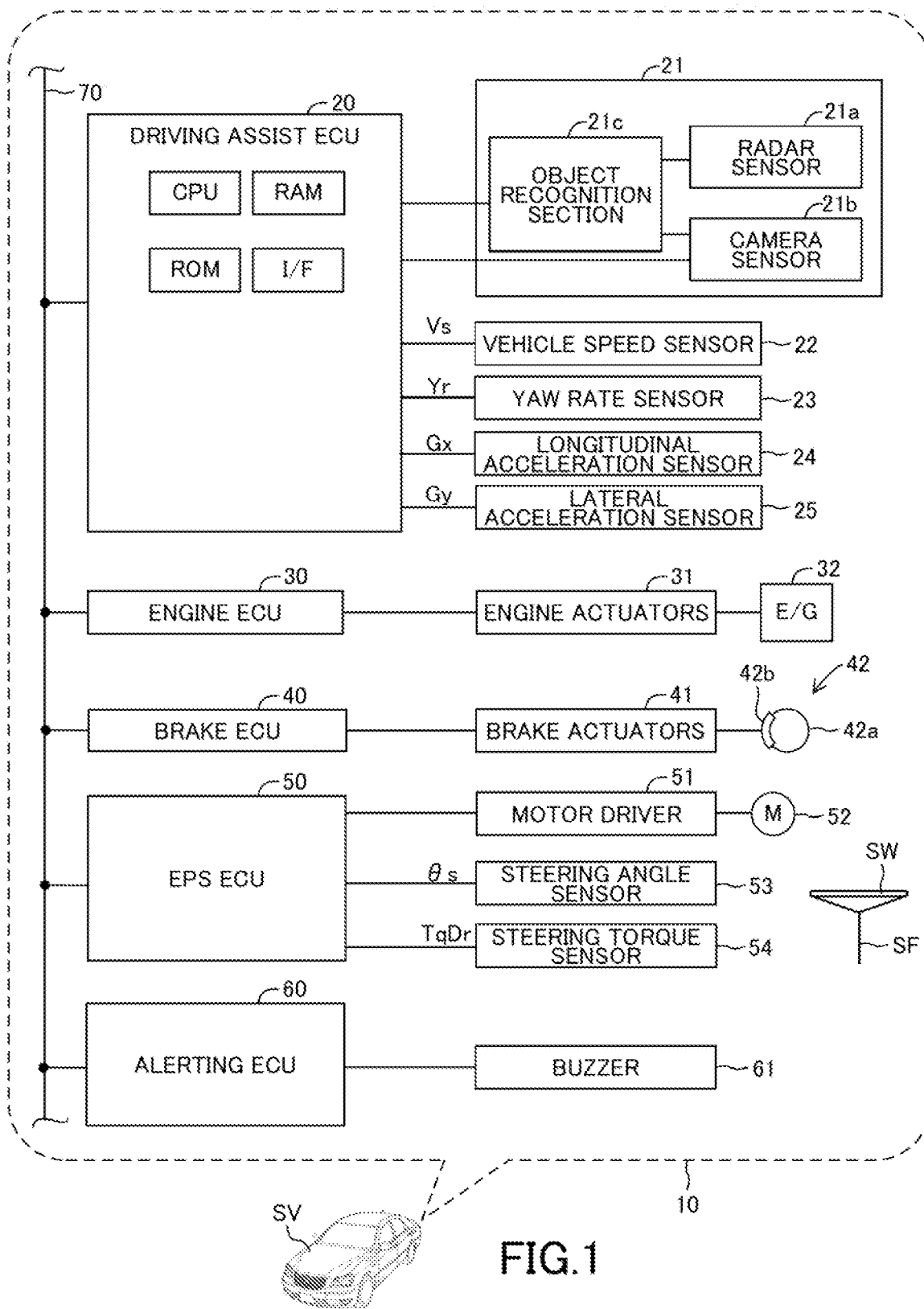
FIG. 1 is a general configuration view showing a collision avoidance assist apparatus according to an embodiment of the invention.

As shown in FIG. 1, a collision avoidance assist apparatus 10 according to an embodiment of the invention, is installed on a vehicle SV. The collision avoidance assist apparatus 10 includes a driving assist ECU 20, an engine ECU 30, a brake ECU 40, an electric power steering ECU 50, and an alerting ECU 60. Hereinafter, the driving assist ECU 20 will be referred to as "DS ECU", and the electric power steering ECU 50 will be referred to as "EPS ECU 50".

The ECUs are electronic control units each including a micro-computer as a main component. The ECUs are also called controllers. The ECUs are electrically connected to each other to perform data exchange or communicate each other via a CAN 70 (Controller Area Network). The micro-computer includes a CPU, a ROM, a RAM, and an interface (I/F). The CPU realizes various functions by executing instructions, or programs, or routines stored in the ROM. All or some of the ECUs may be integrated into an ECU.

A surrounding sensors 21, a vehicle speed sensor 22, a yaw rate sensor 23, a longitudinal acceleration sensor 24, and a lateral acceleration sensor 25 are electrically connected to the DS ECU. The DS ECU receives detection signals or output signals output from the sensors. The sensors may be electrically connected to the ECU other than the DS ECU.

The surrounding sensors 21 include at least one radar sensor 21a, a camera sensor 21b, and an object recognition section 21c. For convenience, the surrounding sensors 21 are also referred to as "obstacle recognition device", and the camera sensor 21b is also referred to as "lane marking recognition device".

The surrounding sensors 21 recognize (i) a surrounding area around the vehicle SV at least including a road ahead of the vehicle SV and (ii) standing objects in the surrounding area around the vehicle SV, and acquire information on the recognized standing objects. The standing objects are moving objects such as walking persons and vehicles, or non-moving objects such as power poles, trees, and guard rails. Hereinafter, the standing object may be referred to as "object".

The surrounding sensors 21 calculate information on the recognized objects, i.e., object information including information listed below and send the information to the DS ECU.

i) A longitudinal distance Dfx of the object corresponding to a signed distance in a center axis direction or x-axis direction of the vehicle SV between a front end of the vehicle SV and the object.

ii) A lateral position Dfy of the object corresponding to a signed distance between a center position of the object and a center axis of the vehicle SV in a direction or a y-axis direction orthogonal to the center axis direction of the vehicle SV.

iii) A relative speed Vfx of the object corresponding to a difference between a speed Vb of the object and a vehicle speed Vs of the vehicle SV (Vfx=Vb−Vs).

iv) Information on a kind of the object.

v) A width W of the object (a lateral width of the object).

vi) A length of the object.

It should be noted that the longitudinal distance Dfx and the lateral position Dfy of the object are also referred to "detected positions", respectively.

The surrounding sensors 21 acquire values described above on a predetermined x-y coordinate. An x-axis of the predetermined x-y coordinate is a coordinate axis which extends a vehicle width center position of the front end of the vehicle SV in the longitudinal direction of the vehicle SV. A forward direction along the x-axis is a positive direction. A y-axis of the predetermined x-y coordinate is a coordinate axis orthogonal to the x-axis. A leftward direction along the y-axis is a positive direction. An origin of the x-y coordinate is located on a predetermined position of the vehicle SV (for example, the vehicle width center position of the front end of the vehicle SV).

In particular, the radar sensor 21a includes a radar wave transmitting/receiving section and a processing section. The radar wave transmitting/receiving section transmits, for example, radio waves each having a millimeter wave band, at least to the surrounding area of the vehicle SV including a forward area ahead of the vehicle SV. Hereinafter, the radio waves each having the millimeter wave band, will be referred to as "millimeter waves". In addition, the radar wave transmitting/receiving section receives reflected waves generated by the transmitted millimeter waves being reflected by portions of the standing object (i.e. reflection points). It should be noted that the radar sensor 21a may be a radar sensor which uses radio waves or radar waves each having a frequency band other than the millimeter wave band.

The processing section of the radar sensor 21a determines whether there is an object, based on reflection point information including (i) a phase difference between the transmitted millimeter wave and the received reflected wave, (ii) an attenuation level of the reflected wave, and (iii) time taken from transmitting the millimeter wave to receiving the reflected wave. The processing section of the radar sensor 21a groups the reflection points which probably belongs to one standing object and recognizes the grouped reflection points as an object.

In addition, the processing section of the radar sensor 21a calculates radar sensor detection information including (i) the longitudinal distance Dfx of the object, (ii) an orientation θp of the object with respect to the vehicle SV, and (iii) the relative speed Vfx between the vehicle SV and the object.

The camera sensor 21b includes a stereo camera and an image processing section. The stereo camera takes images of views of a left area and a right area ahead of the vehicle SV and acquires a pair of a left image and a right image. The image processing section determines whether there is an object in an image taking area, based on the pair of the taken left and right images.

When the image processing section determines that there is an object, the image processing section calculates the orientation θp of the object, the longitudinal distance Dfx of the object, and the relative speed Vfx between the vehicle SV and the object. In addition, the image processing section identifies the kind of the object such as a walking person, or a vehicle (an automobile) by a pattern matching technique and determines or acquires the information on the kind of the object. The information calculated and determined by the image processing section is referred to as "camera sensor detection information".

The object recognition section 21c is electrically connected to and communicates with the processing section of the radar sensor 21a and the image processing section of the camera sensor 21b. The object recognition section 21c receives the radar sensor detection information and the camera sensor detection information.

The object recognition section 21c determines or acquires the object information on the object, based on the radar sensor detection information and the camera sensor detection information. The object recognition section 21c sends the determined conclusive object information on the object to the DS ECU each time a predetermined time elapses.

The image processing section of the camera sensor 21b recognizes a left lane marking (or a left white line) and a right lane marking (or a right white line) provided on the road with a known technique. For example, the image processing section recognizes the left and right white lines by (i) detecting edges at which luminance of the image sharply changes, (ii) detecting outlines defined by the consecutive edges, based on the edges detected at the present and detected before, and (iii) selecting the outlines of the white lines among the detected outlines.

Then, the image processing section calculates position information on the left and right white lines defining a moving lane in which the vehicle SV moves (x-coordinate positions and y-coordinate positions on the x-y coordinate) and sends the position information to the DS ECU each time the predetermined time elapses.

In addition, the image processing section calculates recognition reliability levels of the recognized left and right white lines, respectively based on characteristic amounts such as edge strengths, luminance, and recognition distances acquired from the images of the recognized left and right white lines. The recognition reliability levels of the recognized left and right white lines are parameters which represent reliability levels of recognition results on the recognized left and right white lines. For example, the recognition reliability levels of the white lines are expressed in percentage from 0 percent to 100 percent, depending on the characteristic amounts. The higher recognition reliability levels of the white lines show the higher reliability levels of the recognition results.

The vehicle speed sensor 22 detects a moving speed or a vehicle speed of the vehicle SV and outputs a signal which represents the detected vehicle speed Vs.

The yaw rate sensor 23 detects a yaw rate of the vehicle SV and outputs a signal which represents the detected yaw rate Yr.

The longitudinal acceleration sensor 24 detects a longitudinal acceleration of the vehicle SV and outputs a signal which represents the detected longitudinal acceleration Gx. When the longitudinal acceleration Gx is negative, a magnitude or an absolute value of the longitudinal acceleration Gx represents a deceleration.

The lateral acceleration sensor 25 detects a lateral acceleration of the vehicle SV and outputs a signal which represents the detected lateral acceleration Gy.

The engine ECU 30 is electrically connected to engine actuators 31. The engine actuators 31 include a throttle valve actuator which changes an opening degree of a throttle valve of an internal combustion engine 32. The engine ECU 30 can control a torque generated by the internal combustion engine 32 by controlling the engine actuators 31. The torque generated by the internal combustion engine 32 is transmitted to driven wheels of the vehicle SV via a transmission not shown.

Thus, the engine ECU 30 can control a driving force of the vehicle SV to control an accelerated state (the longitudinal acceleration Gx) of the vehicle SV by controlling the engine actuators 31. When the vehicle SV is a hybrid vehicle, the engine ECU 30 can control the driving force(s) applied to the vehicle SV generated by one or both of the internal combustion engine and at least one electric motor as a vehicle driving source. When the vehicle SV is an electric vehicle, the engine ECU 30 can control the driving force applied to the vehicle SV generated by the electric motor as the vehicle driving source.

The brake ECU 40 is electrically connected to brake actuators 41. The brake actuators 41 are provided in hydraulic circuits between (i) a master cylinder not shown which pressurizes hydraulic oil by a pressing force applied to a brake pedal and (ii) friction brake mechanisms 42 provided to left and right front wheels and left and right rear wheels of the vehicle SV, respectively. Each of the friction brake mechanisms 42 includes a brake disc 42a secured to the corresponding wheel of the vehicle SV and a brake caliper 42b secured to a body of the vehicle SV.

Each of the brake actuators 41 adjusts hydraulic pressure applied to a wheel cylinder provided in the brake caliper 42b, depending on a command from the brake ECU 40 and actuates the wheel cylinder by the hydraulic pressure. Thereby, the brake actuators 41 press the brake pads to the brake discs 42a to generate friction braking forces. Thus, the brake ECU 40 can control the braking forces applied to the vehicle SV to control the accelerated state (the deceleration or the negative longitudinal acceleration Gx) of the vehicle SV by controlling the brake actuators 41.

The EPS ECU 50 is a control device of a known electric power steering system. The EPS ECU 50 is electrically connected to a motor driver 51. The motor driver 51 is electrically connected to a turning motor 52. The turning motor 52 is installed in a steering mechanism including (i) a steering wheel SW, (ii) a steering shaft SF, and (iii) a steering gear mechanism not shown. The turning motor 52 is an electric motor and generates a steering torque by electric power supplied from the motor driver 51. The steering torque turns the left and right steered wheels of the vehicle SV. In other words, the turning motor 52 can control a steering angle of the vehicle SV or turning angles of the steered wheels.

The EPS ECU 50 is electrically connected to a steering angle sensor 53 and a steering torque sensor 54. The steering angle sensor 53 detects a steering angle of the steering wheel SW of the vehicle SV and outputs a signal which represents the detected steering angle θs. The steering torque sensor 54 detects a steering torque applied to the steering shaft SF of the vehicle SV in response to an operation applied to the steering wheel SW and outputs a signal which represents the detected steering torque TqDr. Hereinafter, the steering torque TqDr will be referred to as "driver torque TqDr". The steering angle θs and the driver torque TqDr take positive values, respectively when the vehicle SV is steered in a left turn direction. On the other hand, the steering angle θs and the driver torque TqDr take negative values, respectively when the vehicle SV is steered in a right turn direction.

The EPS ECU 50 detects the driver torque TqDr input to the steering wheel SW by a driver of the vehicle SV by the steering torque sensor 54 and controls the turning motor 52, based on the driver torque TqDr, the steering angle θs, and the vehicle speed Vs. The EPS ECU 50 applies the steering torque (a steering assist torque) to the steering mechanism by driving the turning motor 52 and thereby, assists a steering operation performed by the driver.

When the EPS ECU 50 receives a steering command from the DS ECU while an emergency steering control is being executed, the EPS ECU 50 drives the turning motor 52 by the motor driver 51, based on a target steering torque commanded by the steering command. Thereby, the EPS ECU 50 generates the steering torque corresponding to the target steering torque. This torque is different from the steering assist torque applied to assist the operation applied to the steering wheel SW by the driver and is a torque applied to the steering mechanism, based on the steering command from the DS ECU. Thus, the DS ECU can automatically change the turning angles of the steered wheels of the vehicle SV via the EPS ECU 50 to turn the steered wheels without the steering operation performed by the driver).

The alerting ECU 60 is electrically connected to a buzzer 61. The alerting ECU 60 outputs alerting sounds from the buzzer 61 in response to a command from the DS ECU.

<Summary of Operations of Emergency Steering Control>

Figure 2:
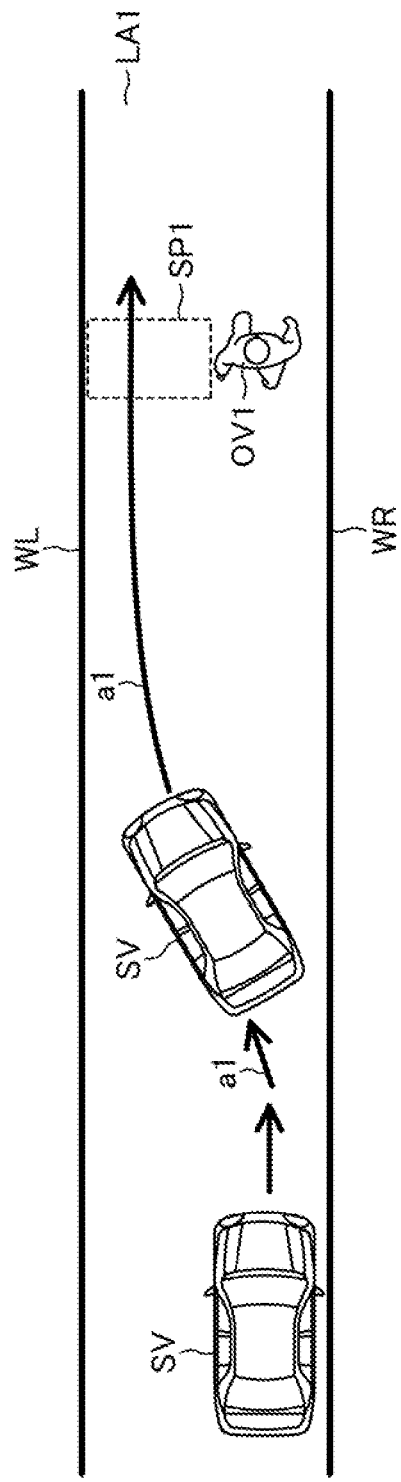
FIG. 2 is a general plan view used for describing a summary of operations of the collision avoidance assist apparatus.

FIG. 2 shows a situation that the vehicle SV moves in the moving lane LA1 which is a straight lane, and there is an obstacle OV1 which is a standing object or an object with which the vehicle SV probably collides. In this case, the DS ECU executes the emergency steering control to avoid a collision of the vehicle SV with the obstacle OV1.

The emergency steering control is a control of steering the vehicle SV to avoid the collision of the vehicle SV with the obstacle OV1 so as not to move the vehicle SV out of the moving lane LA1 or so as not to move the vehicle SV out of the moving lane as possible. The DS ECU executes the emergency steering control as described below.

The DS ECU recognizes the moving lane LA1 defined by the left white line WL and the right white line WR, based on the position information on the left white line WL and the right white line WR each time the predetermined time elapses.

The DS ECU calculates at least one lane shape parameter, based on the position information on the left and right white lines WL and WR each time the predetermined time elapses.

The lane shape parameter is a parameter which represents a shape of the moving lane LA1 or the road. In this embodiment, the lane shape parameter is a parameter which represents a curving degree of the moving lane LA1. In particular, the lane shape parameter is a curvature radius R calculated, based on the recognized white lines.

In addition, the DS ECU acquires or calculates the overall recognition reliability level of recognizing the white lines, based on the recognition reliability level of recognizing the left white line WL and the recognition reliability level of recognizing the right white line WR. The overall recognition reliability level of recognizing the white line represents the overall reliability level of the recognition results on the left and right white lines WL and WR. Hereinafter, the overall recognition reliability level of recognizing the white lines will be referred to as "white line recognition reliability level". For example, the DS ECU calculates an average of the recognition reliability levels of the left and right white lines WL and WR and acquires the calculated average as the white line recognition reliability level. For convenience, the white line recognition reliability level is also referred to as "lane marking recognition reliability level".

The DS ECU calculates a predicted moving route of the vehicle SV, based on the steering angle θs, the yaw rate Yr, and the vehicle speed Vs of the vehicle SV.

The DS ECU determines which the standing object is the moving object or the non-moving object, based on the object information on the standing object. When the standing object is the moving object, the DS ECU calculates the predicted moving route of the standing object, based on the object information. The DS ECU acquires the predicted moving route predicted for the standing object to move, based on (i) the detection positions of the standing object acquired in the past each time the predetermined time elapses and (ii) the detection position of the standing object at present.

The DS ECU determines whether the vehicle SV collides with the standing object, based on the predicted moving route of the vehicle SV and the predicted moving route of the standing object if the standing object keeps the present moving state (when the standing object is the non-moving object, the present stopped state), and the vehicle SV keeps the present moving state. When the DS ECU determines that the vehicle SV collides with the standing object, based on a determination result, the DS ECU determines that the standing object is the obstacle OV1 with which the vehicle SV probably collide.

When the DS ECU determines that the standing object is the obstacle OV1, the DS ECU calculates a predicted collision time TTC relating to the obstacle OV1, based on the longitudinal distance Dfx and the relative speed Vfx of the obstacle OV1. In particular, the DS ECU calculates the predicted collision time TTC by flipping the sign of a value acquired by dividing the longitudinal distance Dfx by the relative speed Vfx (TTC=−Dfx/Vfx).

In addition, the DS ECU calculates routes which allow the vehicle SV to avoid the collision with the obstacle OV1, based on a known method, and sets, as a target avoidance route, the route which allows the vehicle SV to avoid an interference and the collision with the obstacle OV1 by turning the vehicle SV along the route (for example, see JP 2017-105383 A, JP 2017-43261 A, and JP 2018-106230). In this case, the target avoidance route is a route which (i) extends through an avoidance space SP1 set at the left or right side of the obstacle OV1 and (ii) does not move the vehicle SV out of the moving lane LA1, based on the object information on the obstacle OV1 and the positions of the white lines.

When a first condition or a second condition described below is satisfied, the DS ECU starts executing the emergency steering control.

The first condition is satisfied when conditions described below are all satisfied.

(i) A condition that the predicted collision time TTC is equal to or shorter than a first threshold time TTC1.

(ii) A condition that the steering wheel SW is operated in a direction to turn the vehicle SV to avoid the collision of the vehicle SV with the obstacle OV1 before a predetermined time elapses since the predicted collision time TTC is determined as being equal to or shorter than the first threshold time TTC1. The DS ECU determines whether this condition is satisfied, based on the driver torque TqDr. Hereinafter, the time when the predicted collision time TTC is determined as being equal to or shorter than to the first threshold time TTC1, will be referred to as "first determination time".

(iii) A condition that there are no objects other than the obstacle OV1 on the target avoidance route.

(iv) A condition that the white line recognition reliability level is equal to or higher than a first threshold reliability level. This condition is also referred as "white line recognition reliability level condition".

(v) A condition that the vehicle SV moves in the straight lane or the curvature radius R of the moving lane LA1 is equal to or greater than a threshold radius Rth.

The second condition is satisfied when conditions described below are all satisfied.

(i) A condition that the steering wheel SW is not operated in the direction in which the vehicle SV avoids the collision with the obstacle OV1 before the predetermined time elapses since the first determination time.

(ii) A condition that the predicted collision time TTC is equal to or shorter than a second threshold time TTC2 which is set to a time shorter than the first threshold time TTC1.

(iii) A condition that there are no objects other than the obstacle OV1 on the target avoidance route.

(iv) A condition that the white line recognition reliability level is equal to or higher than the first threshold reliability level.

(v) A condition that the vehicle SV moves in the straight lane, or the curvature radius R of the moving lane LA1 is equal to or greater than the threshold radius Rth.

When an execution start condition for starting executing the emergency steering control, i.e., the first or second condition is satisfied, the DS ECU calculates a target yaw rate at which the vehicle SV is moved along the target avoidance route.

The DS ECU calculates a target turning angle of the steered wheels of the vehicle SV to achieve the target yaw rate, based on the calculated target yaw rate and the vehicle speed Vs of the vehicle SV. Then, the DS ECU sends a steering command for avoiding the collision which represents the calculated target turning angle to the EPS ECU 50.

The EPS ECU SO calculates a target steering torque to control an actual turning angle to the target turning angle, i.e., to make the actual turning angle follow the target turning angle. Then, the EPS ECU 50 drives the turning motor 52 to output the steering torque corresponding to the calculated target steering torque to turn the steered wheels of the vehicle SV.

Thereby, the DS ECU executes the emergency steering control to steer the vehicle SV to avoid the collision of the vehicle SV with the obstacle OV1 via the EPS ECU 50 without moving the vehicle SV out of the moving lane LA1 as shown by an arrow a1.

For convenience, the emergency steering control executed in response to the first condition becoming satisfied, is also referred to as "emergency steering assist control", and the emergency steering control in response to the second condition becoming satisfied, is also referred to as "emergency steering automatic control".

The DS ECU may be configured to output a command to the alerting ECU 60 to execute an alerting control at the first determination time (i.e., the time when the predicted collision time TTC is determined as being equal to or shorter than the first threshold time TTC1). The alerting control is, for example, a control of outputting alerting sounds from the buzzer 61 for alerting the driver). In this case, when the driver knows the obstacle OV1, and operates the steering wheel SW in the direction in which the vehicle SV avoids the collision with the obstacle OV1 before the predetermined time elapses since output of the alerting sounds is started, the execution of the emergency steering assist control is started. Thereby, the collision avoidance assist apparatus 10 operates to assist the operation applied to the steering wheel SW by the driver to avoid the collision of the vehicle SV with the obstacle OV1. When the second condition becomes satisfied, the execution of the emergency steering automatic control is started if the steering wheel SW has not been operated before the predetermined time elapses since the output of the alerting sounds is started. In this case, the collision avoidance assist apparatus 10 operates to steer the vehicle SV to automatically avoid the collision of the vehicle SV with the obstacle OV1 even if the steering wheel SW is not operated by the driver.

<Summary of Stopping or Cancelling Emergency Steering Control>

When the overall reliability level of the recognition results on the left and right white lines lowers while the emergency steering control is being executed, the DS ECU may not adequately execute the emergency steering control due to mistaken recognition of the white lines. For avoiding the execution of the inadequate emergency steering control, the DS ECU commands the EPS ECU 50 to stop executing the emergency steering control when the white line recognition reliability level becomes lower than a predetermined threshold (i.e., a second threshold reliability level described later).

<Summary of Operations of Collision Avoidance Assist Apparatus>

Figure 3:
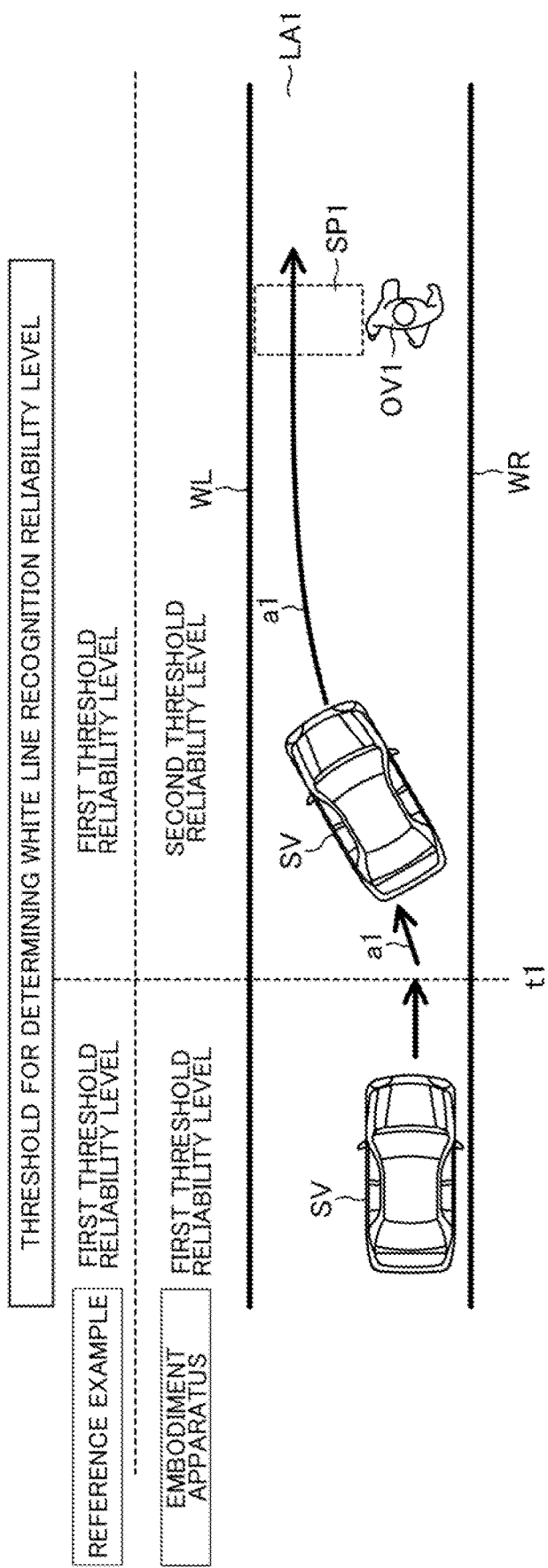
FIG. 3 is a general plan view used for describing the summary of the operations of the collision avoidance assist apparatus.

FIG. 3 shows a situation that (i) the vehicle SV moves in the moving lane LA1 which is a straight lane, and (ii) the execution of the emergency steering control is started at a time t1.

Figure 4:
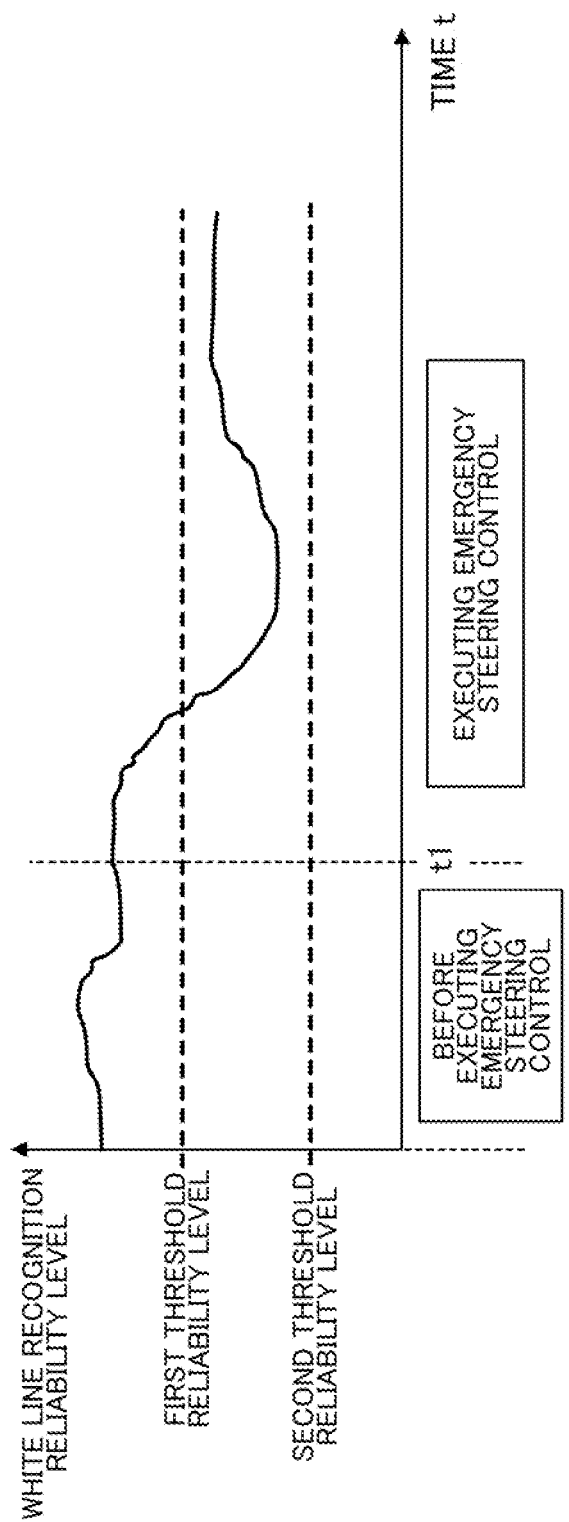
FIG. 4 is a view showing a graph used for describing the summary of the operations of the collision avoidance assist apparatus.

In the case shown in FIG. 3, when the execution of the emergency steering control is started, a lateral motion occurs in the vehicle SV, and a part of the right white line WR is blinded by the obstacle OV1 from the camera sensor 21b. The right white line WR is at the right side of the obstacle OV1 which the vehicle SV does not pass by to avoid the collision with the obstacle OV1 (hereinafter, the side of the obstacle OV1 which the vehicle SV does not pass by to avoid the collision with the obstacle OV1, will be also referred to as "non-avoidance side"). Thereby, the recognition reliability level of recognizing the right white line WR is low. Thus, as shown in FIG. 4, the white line recognition reliability level calculated, based on the left and right white lines WL and WR, is low while the emergency steering control is being executed. Causes of lowering the white line recognition reliability level as described above, are not essential ones such as deterioration of the white lines and decreasing of intensity of the white lines. Thus, it is unnecessary to stop executing the emergency steering control. However, as shown as a reference example, if a process of determining the white line recognition reliability level is performed, based on the first threshold reliability level while the emergency steering control is being executed, the white line recognition reliability level becomes lower than the first threshold reliability level, and the execution of the emergency steering control is unnecessarily stopped.

In this connection, the DS ECU of the collision avoidance assist apparatus 10 or the embodiment apparatus sets a threshold used for determining the white line recognition level to the first threshold reliability level before the DS ECU starts executing the emergency steering control (i.e., when the DS ECU does not execute the emergency steering control). This case is the same as the reference example. When the DS ECU executes the emergency steering control, the DS ECU sets the threshold used for determining the white line recognition reliability level to the second threshold reliability level. The second threshold reliability level is set to a value on percentage lower than the first recognition reliability level.

Thereby, as shown in FIG. 4, even when the white line recognition reliability level lowers due to above-described causes derived from the execution of the emergency steering control, there is less probability that the white line recognition reliability level becomes lower than the second threshold reliability level. Thus, the DS ECU can eliminate an unnecessary execution of a process of stopping executing the emergency steering control even when the above-described causes derived from the execution of the emergency steering control, occur.

<Specific Operations>

Figure 5:
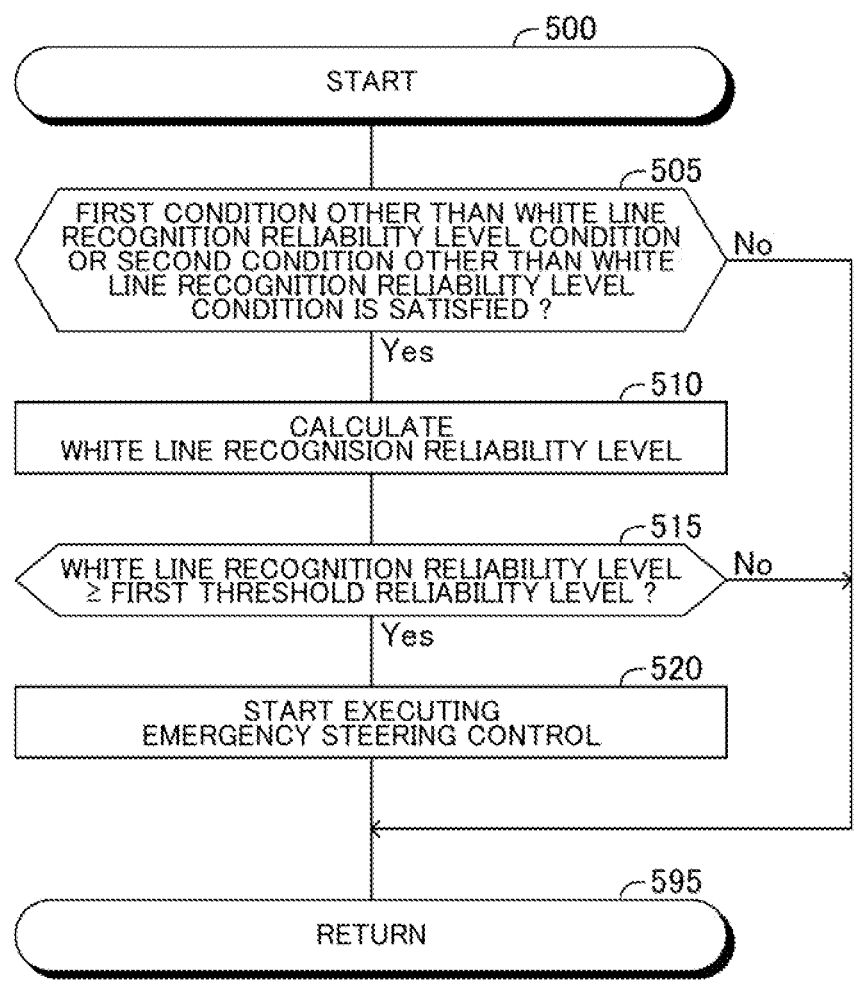
FIG. 5 is a view showing a flowchart of a routine executed by a CPU of a driving assist ECU.
Figure 6:
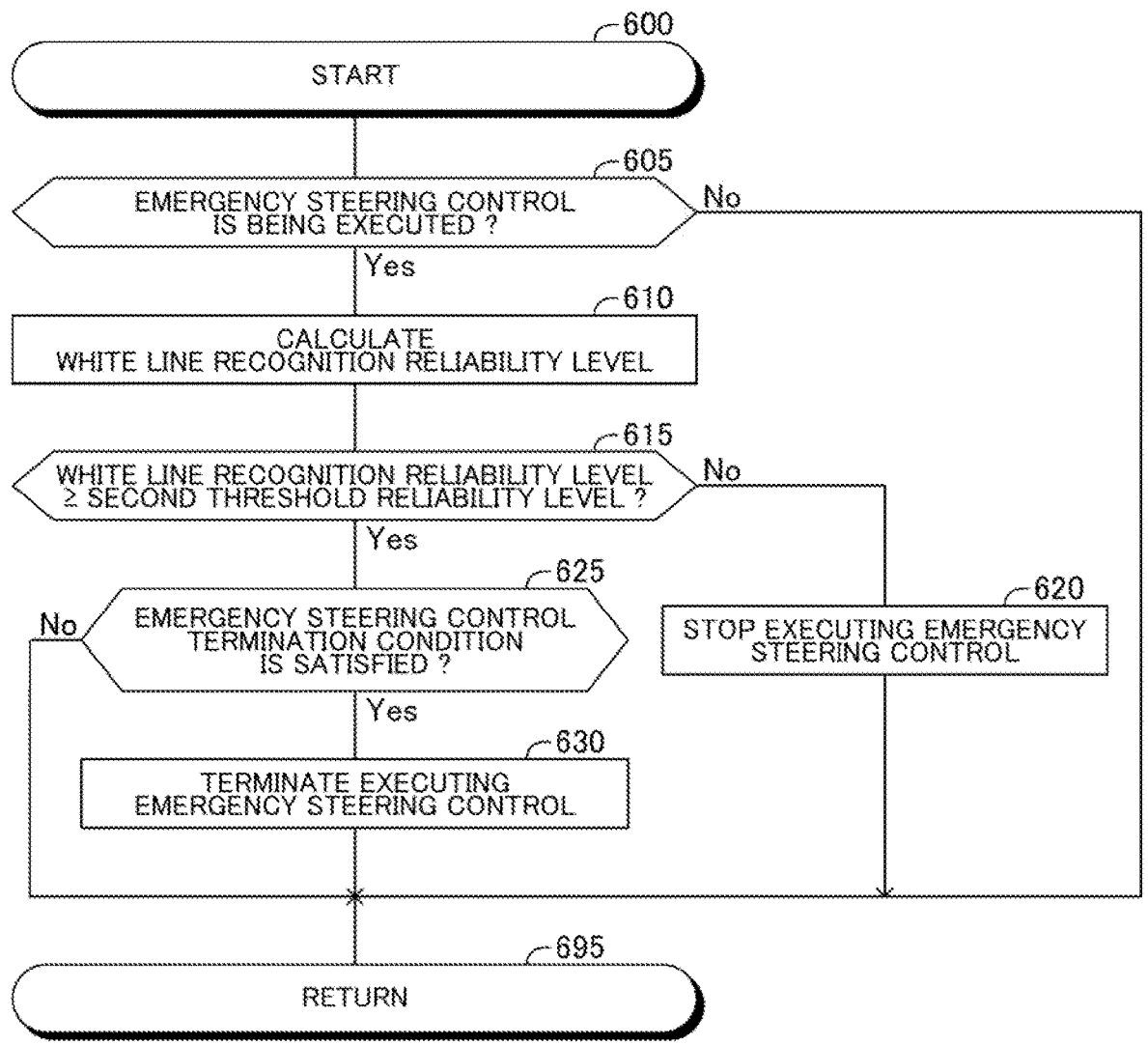
FIG. 6 is a view showing a flowchart of a routine executed by the CPU of the driving assist ECU.

The CPU of the DS ECU is configured or programmed to execute routines shown by flowcharts in FIG. 5 and FIG. 6 each time the predetermined time elapses.

Thus, at a predetermined timing, the CPU starts executing a process from a step 500 in FIG. 5 and proceeds with the process to a step 505 to determine whether any one of (i) the first condition other than the white line recognition reliability level condition that the white line recognition reliability level is equal to or higher than the first threshold reliability level and (ii) the second condition other than the white line recognition reliability level condition, is satisfied.

When the first and second conditions other than the white line recognition reliability level condition are not satisfied, the CPU determines "No" at the step 505 and proceeds with the process to a step 595 to terminate executing this routine once.

On the other hand, when any one of the first and second conditions other than the white line recognition reliability level condition is satisfied, the CPU determines "Yes" at the step 505, executes a process of a step 510 described below, and proceeds with the process to a step 515.

Step 510: The CPU calculates the white line recognition reliability level, based on the left and right white lines.

When the CPU proceeds with the process to a step 515, the CPU determines whether the white line recognition reliability level is equal to or higher than the first threshold reliability level.

When the white line recognition reliability level is lower than the first threshold reliability level, the CPU determines "No" at the step 515 and proceeds with the process to the step 595 to terminate executing this routine once.

On the other hand, when the white line recognition reliability level is equal to or higher than the first threshold reliability level, the CPU determines "Yes" at the step 515, executes a process of a step 520 described below, and proceeds with the process to the step 595 to terminate executing this routine once.

Step 520: The CPU starts executing the emergency steering control.

In addition, at a predetermined timing, the CPU starts executing a process from a step 600 in FIG. 6 and proceeds with the process to a step 605 to determine whether the emergency steering control is being executed. The CPU determines that the emergency steering control is being executed until the execution of the emergency steering control is terminated from when the execution of the emergency steering control is started, or until the execution of the emergency steering control is stopped from when the execution of the emergency steering control is started.

When the emergency steering control is not being executed, the CPU determines "No" at the step 605 and proceeds with the process to a step 695 to terminate executing this routine once.

On the other hand, when the emergency steering control is being executed, the CPU determines "Yes" at the step 605, executes a process of a step 610 described below, and proceeds with the process to a step 615.

Step 610: The CPU calculates the white line recognition reliability level, based on the left and right white lines.

When the CPU proceeds with the process to the step 615, the CPU determines whether the white line recognition reliability level is equal to or higher than the second threshold reliability level. As described above, the second threshold reliability level is set to a value lower than the first threshold reliability level.

When the white line recognition reliability level is lower than the second threshold reliability level, the CPU determines "No" at the step 615, executes a process of a step 620 described below and proceeds with the process to the step 695 to terminate executing this routine once.

Step 620: The CPU stops executing the emergency steering control.

On the other hand, when the white line recognition reliability level is equal to or higher than the second threshold reliability level, the CPU determines "Yes" at the step 615 and proceeds with the process to a step 625 to determine whether a termination condition for terminating executing the emergency steering level is satisfied. The termination condition for terminating executing the emergency steering control is set, for example, to a suitable predetermined condition for determining that avoiding the collision of the vehicle SV with the obstacle by the emergency steering control, is completed.

When the termination condition for terminating executing the emergency steering control is not satisfied, the CPU determines "No" at the step 625 and proceeds with the process to the step 695 to terminate executing this routine once.

On the other hand, when the termination condition for terminating executing the emergency steering control is satisfied, the CPU determines "Yes" at the step 625, executes a process of a step 630 described below, and proceeds with the process to the step 695 to terminate executing this routine once.

Step 630: The CPU terminates executing the emergency steering control.

<Effects>

As described above, the collision avoidance assist apparatus 10 can eliminate the unnecessary execution of the process of stopping executing the emergency steering control.

<Modified Examples>

The embodiment of the invention has been specifically described, but the invention is not limited to the embodiment. Various modified examples can be employed, based on technical concepts of the invention without departing from a scope of the invention.

In the above-described embodiment, the DS ECU may be configured to execute at least one of processes executed by the object recognition section 21c in place of the object recognition section 21c.

Further, in the above-described embodiment, a curvature (=1/R) may be used in place of the curvature radius R. In this case, the DS ECU determines that the moving lane is a curved lane when the curvature is greater than a threshold curvature, and the moving lane is a straight lane when the curvature is equal to or smaller than the threshold curvature.

Furthermore, in the above-described embodiment, the DS ECU may be configured to calculate the white line recognition reliability level while the emergency steering control is being executed, based on only the white line at an avoidance side which is one of the left and right side of the obstacle OV1 which the vehicle SV passes by to avoid the collision with the obstacle OV1. That is, at the step 610 in FIG. 6, the CPU may calculate the white line recognition reliability level, based on only the white line at the avoidance side.

According to this modified example, the white line recognition reliability level is calculated, based on only the white line of the recognition reliability level which is not readily lowered due to behaviors of the vehicle SV derived from the execution of the emergency steering control. For example, the recognition reliability level of recognizing the white line at the avoidance side is used as the white line recognition reliability level. Thus, the white line recognition reliability level does not readily lower while the emergency steering control is being executed. Thus, the white line recognition reliability level does not readily become lower than the second threshold reliability level while the emergency steering control is being executed. Thus, the unnecessary execution of the process of stopping executing the emergency steering control can be surely eliminated.

Furthermore, in the above-described embodiment, the DS ECU may be configured to stop the vehicle SV before the obstacle OV1 by executing an automatic braking control when the vehicle SV can be stopped before the obstacle OV1 by braking the vehicle SV before the DS ECU starts executing the emergency steering control.

Furthermore, in the above-described embodiment, the DS ECU may be configured to execute only one of the emergency automatic steering control and the emergency steering assist control as the emergency steering control.

What is claimed is:

1. A collision avoidance assist apparatus, comprising:
a lane marking recognition device which recognizes a left lane marking and a right lane marking provided on a road on which a vehicle moves;
an obstacle recognition device which recognizes an obstacle in an area ahead of the vehicle;
an electric motor which applies a steering torque to a steering mechanism including a steering wheel of the vehicle to change a steering angle of at least one steered wheel of the vehicle; and
an electronic control unit configured to:
calculate a lane marking recognition reliability level representing a reliability level of an overall recognition result on the left and right lane markings; and
execute an emergency steering control including processes to:
determine a target steering torque which changes the steering angle to avoid a collision of the vehicle with the obstacle without moving the vehicle out of the moving lane when (i) the electronic control unit determines that the vehicle has a high probability of colliding with the obstacle, (ii) a moving lane defined by the left and right lane markings is a straight lane, and (iii) the calculated lane marking recognition reliability level is equal to or higher than a first threshold reliability level; and
drive the electric motor to apply the steering torque corresponding to the determined target steering torque to the steering mechanism,
wherein the electronic control unit is configured to stop executing the emergency steering control when the lane marking recognition reliability level becomes lower than a second threshold reliability level set to a value lower than the first threshold reliability level.

2. The collision avoidance assist apparatus as set forth in claim 1, wherein the electronic control unit is configured to:
calculate the lane marking recognition reliability level, based on both of the left and right lane markings before the electronic control unit starts executing the emergency steering control; and
calculate the lane marking recognition reliability level, based on only one of the left and right lane markings at the side of the obstacle which the vehicle passes by while the electronic control unit executes the emergency steering control.

* * * * *